United States Patent [19]

Lapeyre

[11] 4,051,949
[45] Oct. 4, 1977

[54] CONVEYOR SYSTEM

[75] Inventor: James M. Lapeyre, New Orleans, La.

[73] Assignee: The Laitram Corporation, New Orleans, La.

[21] Appl. No.: 687,029

[22] Filed: May 17, 1976

[51] Int. Cl.² ............................................. B65G 15/30
[52] U.S. Cl. ................................. 198/853; 74/245 C; 74/250 C
[58] Field of Search ............... 198/850, 851, 853, 793, 198/796, 635; 74/235, 245 R, 245 C, 245 P, 245 L P, 250 R, 250 C

[56] References Cited

U.S. PATENT DOCUMENTS

| 2,141,876 | 12/1938 | Perkins | 198/851 |
| 3,202,260 | 8/1965 | Wolf | 198/635 |
| 3,834,514 | 9/1974 | Wakamatsu | 198/325 |
| 3,870,141 | 3/1975 | Lapeyre et al. | 198/853 |
| 3,915,025 | 10/1975 | Poerink | 198/850 |

Primary Examiner—Johnny D. Cherry
Assistant Examiner—Joseph E. Valenza
Attorney, Agent, or Firm—Schiller & Pandiscio

[57] ABSTRACT

A conveyor system employing a modular belt of the type described in U.S. Pat. No. 3,870,141 in which the upper surfaces of the modules are shaped to provide guide channels for the teeth of a conveyor comb as the belt passes over a wheel. Upper surfaces of the module and/or the comb teeth can be shaped to minimize the rise and fall of the belt relative to the comb as the belt passes over the wheel.

24 Claims, 10 Drawing Figures

CONVEYOR SYSTEM

This invention is concerned with conveyors and particularly with a novel and improved conveyor-and-comb combination for transferring articles to and from a conveyor belt.

In U.S. Pat. No. 3,870,141 there is shown and described a conveyor belt formed of a multiplicity of pivotally interlocked and generally rectangular modules. Each module includes end sections in the form of spaced links with aligned holes for pivot rods which pivotally join the modules, the intermediate sections of the pivot links being joined by one or more integral cross members to form a rigid supporting grid. The end sections of pivotally connected modules are intermeshed and typically arranged in staggered relation transverse to the direction of belt travel, so that the width and length of the belt can be varied by changing the number of modules without substantially impairing the strength of the belt. The modules and pivot rods are designed to be formed typically of polymeric plastics so that they can particularly be used under severe operating conditions such as extremes of temperature, corrosive fluids and the like. Such chain link conveyor belts are extremely useful, for example, in the food processing and packaging industry, not only for their ruggedness under adverse operating conditions but because substantially no contaminating lubrication need be provided.

Another desirable aspect of the conveyor belt described in U.S. Pat. No. 3,870,141 is the ease with which it can be driven by one or more sprocket wheels having teeth which can extend into the interspace between the links and engage the link ends which are meshed with one another.

While such belts have been extremely successful for use with articles which are dropped on or off of the belt, in a large number of cases it is desirable to move articles on or off the belt with as little disturbance of the position of the article or as little shock to the article as possible. For instance, if the belt is to be used to convey cans or jars in a food processing operation, it is of course desirable to avoid tipping the containers and often it is preferred to maintain, as closely as possible, the original positioning of the containers as they are placed on the belt so that for example filling operations can be effected automatically. For high speed operation and indeed for economy of operation, it is highly desirable to feed containers of this type onto a belt automatically in a spaced relationship.

A principal object of the present invention is to provide a system for so feeding containers off and onto a belt in connection with the well known conveyor comb which generally comprises a substantially fixed platform formed of a plurality of teeth extending horizontally between adjacent portions of the conveyor belt in the direction of the belt travel. The belt of the present invention comprises modules similar to the type shown in U.S. Pat. No. 3,870,141 incorporating one or more cross members which rigidly couple a plurality of link ends together. To position the upper surface of the comb and the upper surface of the belt in substantially coplanar relation, the upper portions of a number of links of each module of the present invention extend as vertical flights well above the upper surface of the cross member so as to provide sufficient axial passageways through which the teeth of the comb can extend while the belt is in motion. A conveyor belt with extended links or flights necessarily has a rather substantial thickness or depth, as well as a substantial length (i.e. along the direction of belt travel) between link ends. Because of the length of each module and the depth thereof due to the extended or heightened flights, as such modules pass around a sprocket wheel, an effect (hereinafter designated the chordal effect) may occur which tends to interfere with the smooth transfer between conveyor surface and comb with respect to an article carried by the conveyor. This chordal effect, which will be described in detail hereinafter, essentially results from one end of the conveyor module being lifted above the level of the common plane of the upper surface of the comb and the conveyor belt, thereby obviously tending to lift and/or drop articles passing between the comb and the conveyor belt.

The present invention therefore has as another particular object, the minimization of the choral effect with respect to a comb and conveyor belt combination employing belts of the type similar to those described in the aforesaid U.S. Pat. No. 3,870,141.

Other objects of the present invention will in part be obvious and will in part appear hereinafter. The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be made to the following detailed description taken in connection with the accompanying drawings wherein:

FIG. 3A is a section taken along the line 3—3 of an alternative embodiment of FIG. 2;

Figure 1:
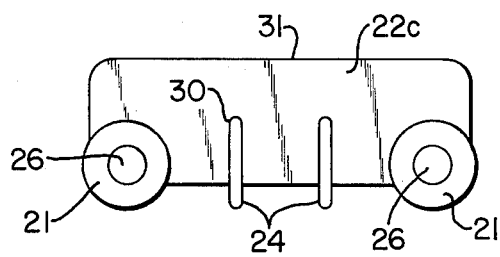
FIG. 1 is a side view of a module incorporating principles of the present invention.

Reference is now made particularly to FIGS. 1 through 5 inclusive of the drawing wherein there is illustrated an embodiment of chain link conveyor modules of the invention. These modules, generally designated 20, are designed to be formed as an integral unit, as for example by injection molding. Each module 20 comprises a multiplicity of elongated, parallel, spaced apart link-like elements. A typical module may comprise, for example, as few as four or five links and as many as one hundred or more. Thus, in the form shown, the length dimension of the module is equal to the length of each link and the width is determined by the number of links and the spacing between the links.

Each of the link-like elements is formed of a pair of like link end sections 21 joined by at least one intermediate or connecting section 22 having a generally rectangular cross section with a greater depth (or height) than width. Thus all link-like elements have substantially identical lengths (i.e. the distance between the extremeties of each pair of joined link ends). All of the link-like elements of a module are joined as a unit by at least one and preferably a pair of spaced cross-members 24 formed integrally with connecting sections 22 to form a rigid structure. For all link-like elements, end sections 21 are wider than the connecting sections 22 and are formed with parallel planar facing surfaces 25 each spaced from adjacent such surfaces of adjacent end sections by just slightly greater (e.g. 0.003 inches) than the width of end sections 21, so that the end sections of the link elements of each module can fit snugly but movably between the end sections of every module with parallel facing surfaces 25 in contact with one another. Each of end sections 21 is formed so as to circumscribe a corresponding one of aligned holes 26 for receiving pivot pins or rods 28 (as in FIG. 6) adapted to pivotally connect the modules end-to-end, while laterally aligning adjacent modules. Cross members 24 function to maintain the link-like elements in parallel relation so that the surfaces of end sections 21 are kept parallel and pivot holes 26 aligned, thereby minimizing bending stresses across pivot pin 28.

In the module of the present invention there are a first and second plurality of such link-like elements which differ from one another in the relative height of connecting sections 22 and the shape of the upper surfaces of such connecting sections.

Figure 3:
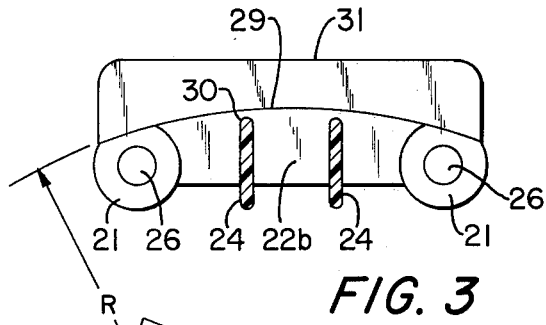
FIG. 3 is a section taken along the line 3—3 of one embodiment of FIG. 2.
Figure 2:
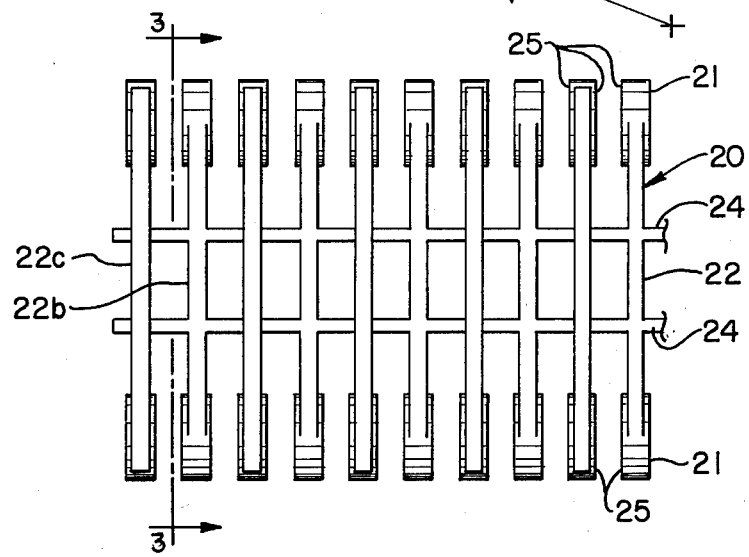
FIG. 2 is a top plan view of the module in FIG. 1.
Figure 4:
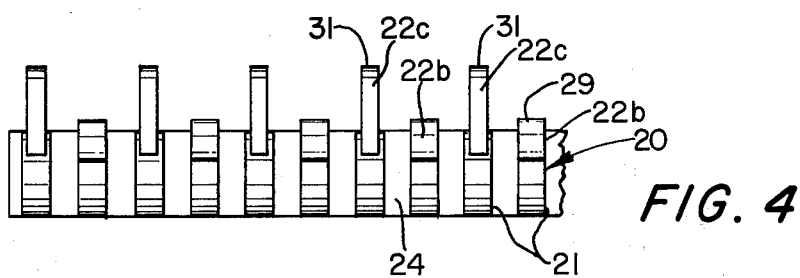
FIG. 4 is a front view of the module of FIG. 2.
Figure 5:
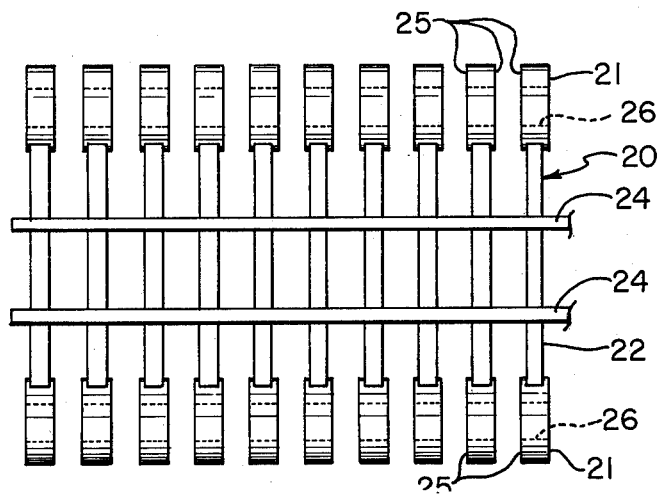
FIG. 5 is a bottom plan view of the module of FIG. 2.

The first plurality of link-like elements, particularly shown in FIGS. 3 and 4, each comprises a connecting section coupling a pair of link ends and designated by the numeral 22b. Each section 22b possesses an upper surface 29 which extends at least to or above the upper surface 30 of cross-members 24. In FIG. 3, surface 29 is simply arcuate, the radius of curvature thereof being substantially equal to the sum of the height of a link end 21 and the radius (designated R) of the sprocket wheel which is intended to drive a belt formed from the module. Thus, all of the arcuate upper surfaces 29 of a module lie at a like height along a curved surface.

FIG. 3A shows an alternative embodiment in which each section 22b is provided with a substantially flat upper surface 29a lying parallel with a line joining the centers of holes 26. As in FIG. 3, surfaces 29a lie in a common plane extending above the upper surfaces of cross-members 24.

As shown particularly in FIGS. 1, 3 and 4, each of a second plurality of such link-like elements in each module comprises a connecting section in the form of a flat vane extended upwardly as a flight designated 22c. All of the upper surfaces 31 of flights 22c lie at a like height which is substantially above the common height of upper surfaces 29 (or 29a as the case may be) of connecting sections 22b of the module. In the form shown in FIG. 1, surface 31 is substantially flat and lies typically parallel with a line joining the centers of holes 26 for each link-like element, the ends of surface 31 terminating preferably at radius corners.

In forming the modules of the present invention, it will be appreciated that the dimensions thereof are dependent on the sprocket wheel with which the modules are to be used. Care must be taken to insure that the arcuate upper surface 29 of section 22b does not intersect either hole 26 in respective ends 21 of the corresponding link-like elements. The sprocket wheel radius should be of sufficient dimension relative to the length of each module 20 (the distance between the outer extremities of each coupled pair of link ends 21) so that holes 26 at all times are fully circumscribed by supporting material of the corresponding link end.

Thus, the end sections 21 of each of one plurality of link-like elements are joined by a flat-surfaced intermediate section or flight 22c (when viewed in side elevation) and the end sections 21 of the other plurality of link-like elements are joined by intermediate sections 22b and may be end sections which are only segments of circles in cross section. It will be seen that flights 22c and sections 22b of a module are arranged to form channels adapted to receive the teeth of a conveyor comb so that articles can be transferred to and from a belt formed of the modules. The number of intermediate sections 22b in the first plurality of link-like elements is not necessarily equal to the number of intermediate sections 22c in the second plurality of link-like elements, but in the preferred form of a module, the intermediate sections of each plurality are alternated with one another and are equal in number. However, it will be obvious that where minimal support, as provided by flat center sections 31, is required for articles to be carried on the conveyor belt, as for example with articles which are very large with respect to the spacing between link-like elements of the module, the ratio of intermediate sections 22b to intermediate sections 22c for each module can be 2:1, 3:1 or even greater. Thus, the modules may take a number of different configurations depending upon the nature of the objects to be conveyed.

Figure 6:
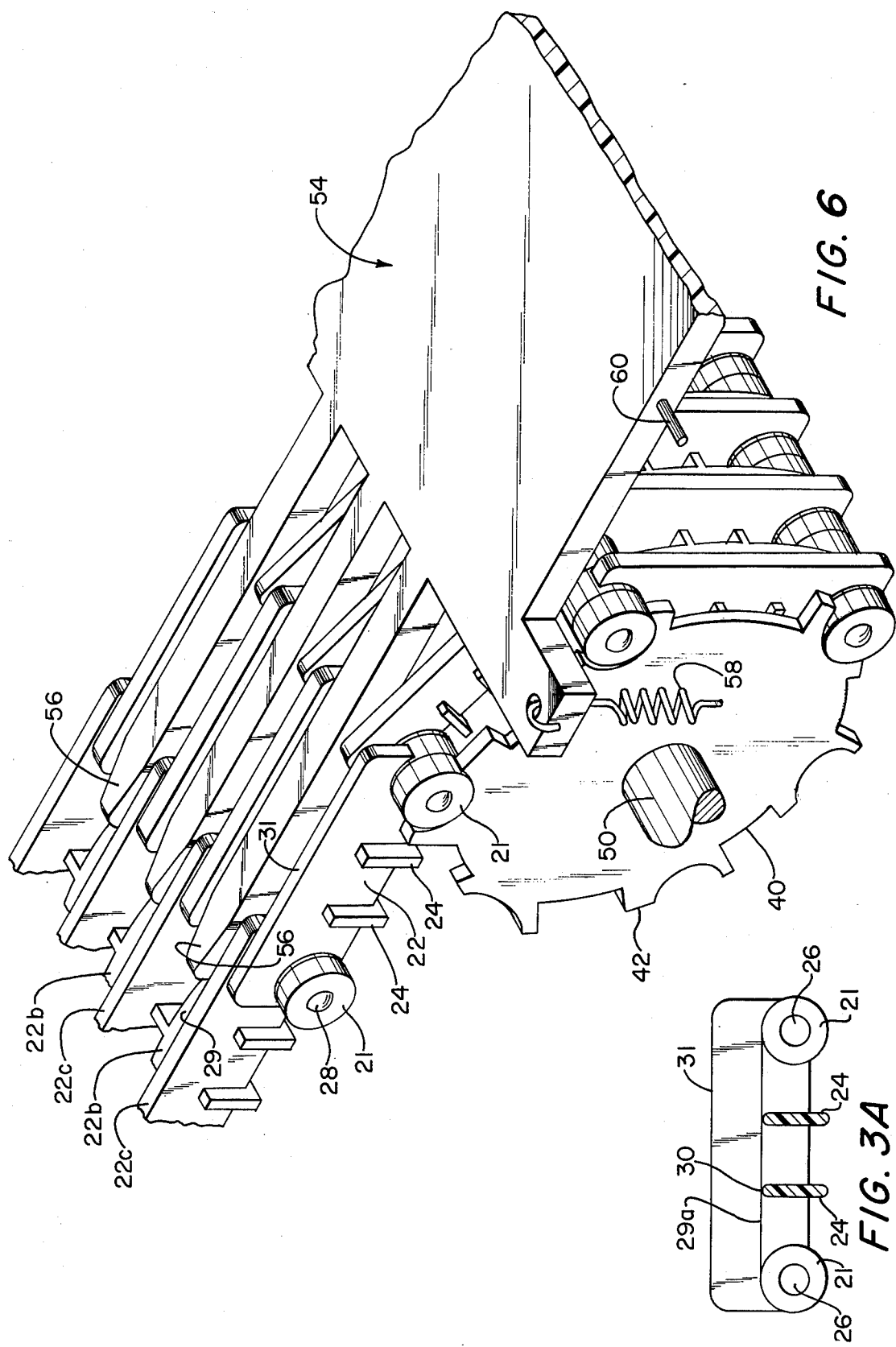
FIG. 6 is a perspective view, partly in fragment, of a portion of the combination of comb and modular conveyor belt embodying the principles of the present invention.

A multiplicity of modules are assembled in end-to-end and side-by-side relation and coupled by pivot rods 28 to form a conveyor belt particularly as shown in FIG. 6. As in U.S. Pat. No. 3,870,141, cross members 24 function to absorb forces acting on the link-like elements which would otherwise tend to separate the links as well as bending forces which would tend to bend pivot pin 28. Thus, the belt formed of the modules of the present invention is substantially similar in operating characteristics to the conveyor belt described in said U.S. Pat. No. 3,870,141, and possess the advantages of that prior art belt arising out of the structure of such module and the ability to arrange the modules in staggered relation and the like.

Figure 7:
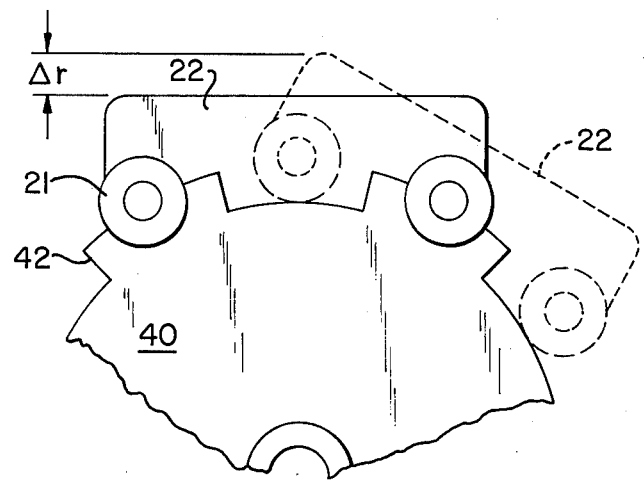
FIG. 7 is a schematic diagram, partly in fragment, showing the relation of a module and sprocket of the prior art and the chordal effect occurring in its operation.

Before describing the operation of the device of FIG. 6 it is desirable to explain the aforesaid chordal effect. FIG. 7 shows a segment of a typical sprocket wheel 40 (shown in fragment) having a plurality of teeth 42 adapted to engage link ends of module 20 coupled in a belt, only one such module being shown in elevation for simplicity in exposition.

In operation of the belt formed as shown in FIG. 7, it will be seen that as sprocket wheel 40 rotates, typically clockwise as observed, teeth 42 carry module 20 to the position shown by dotted lines. This change in position of module 20 will be seen to cause one end of the upper surface of flight 22c to extend a distance $\Delta r$ above the level at which flight 22c was originally shown. This change $\Delta r$ in distance, termed the chordal effect, will be seen to cause items carried on the upper surface of the module to be lifted (upon rotation of the belt about wheel 40) somewhat above the desired common level of the upper surface of a belt.

Referring again to the rendition of the system as shown in FIG. 6, it will be observed that the conveyor belt is formed of modules with upper surfaces configured in the manners shown in FIGS. 1 and 3, the modules being driven by sprocket wheel 40 mounted for rotation about shaft 50. Teeth 42 of wheel 40 are designed to engage the modules particularly at joined link ends 21. There is also provided comb 54 having a plurality of parallel teeth 56, the axes of which are spaced apart preferably by distances substantially equal to the distances between flights 22b of the modules in the belt. In the form shown in FIG. 1, teeth 56 have a depth (i.e. vertical dimension) not greater than the distance between the uppermost portion of the upper surface of each connecting section 22c of the first plurality of connecting sections and the upper surface 32 of the adjacent flight 22b of the module. The free ends of teeth 56 are tapered in width (horizontally across the belt).

Comb 54 is mounted for its rotation about pivot 60 on means (not shown) for supporting the comb. Teeth 56 are held down to ride on sections 22b of the modules by resilient loading (typically by spring 58) which bias comb 54 for rotation in a counter-clockwise direction around pivot 60.

The chordal effect which would be expected to cause comb 54 to oscillate up and down because the lower surfaces of teeth 56 tend to ride on the upper surface of connecting sections 22b of the modules, is considerably minimized or even eliminated by the curvature of surfaces 29.

Figure 8:
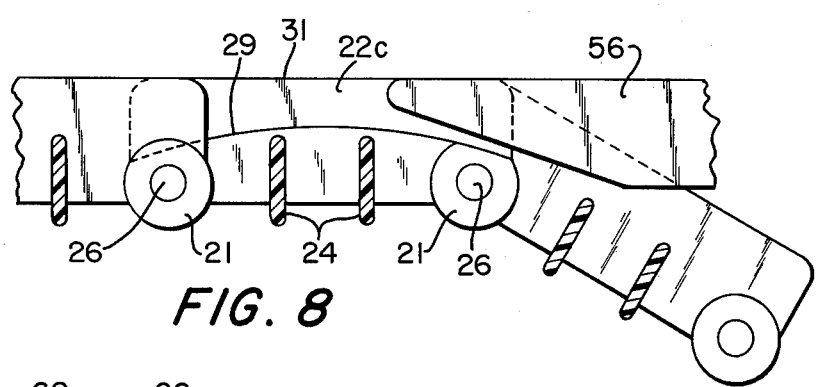
FIG. 8 is a side view, partly in fragment of a portion of another combination of comb and modular conveyor belt embodying the principles of the present invention.

The chordal effect can be substantially completely eliminated so that the comb can be ridigly mounted instead of pivotally mounted as in FIG. 6. As shown in FIG. 8, only in elevation, teeth 56 (shown only in fragment) have bottom surfaces 62 shaped and positioned so as to lie at a distance with respect to the center of rotation of sprocket wheel 40 (not shown) not less than and preferably slightly greater than the radius of curvature of the upper surface 29 of section 22b of the modules of the belt.

Figure 9:
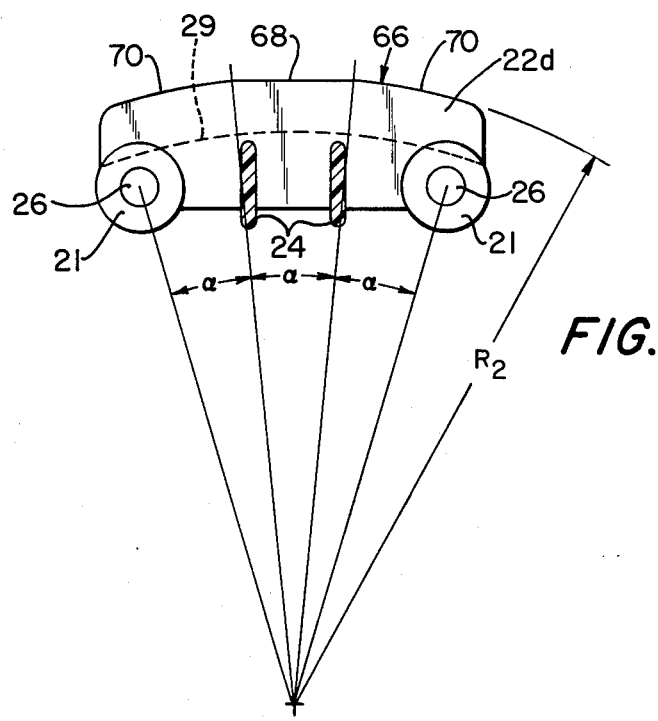
FIG. 9 is a side view of an alternative form of module incorporating principles of the present invention.

As shown in FIG. 9, in an alternative embodiment of module 20, each of the second plurality of link-like elements in each module comprises a connecting section extended upwardly as a flight designated 22d similar to flight 22c of FIG. 1 in that the upper surface 66 of each flight 22d extends substantially above the upper surface of connecting sections 22b of the module. Surface 66 however is shaped to have a substantially flat intermediate or center section 68 typically parallel with a line joining the center of holes 26 for each link-like element and two sloping end portions 70 adjoining the respective ends of center section 68. Each sloping end portion 70 is typically formed with an upper surface which is a segment of an arc (or a line tangent to such segment of arc) having a radius of curvature (shown in FIG. 9 as R2) approximately equal to the sum of the height of flight 22d at its center plus the radius of the sprocket wheel which is to be used to drive a belt formed of the modules, R2 being of course greater than R. Thus, as shown in FIG. 9, each flight 22d can be considered to be formed of three integrally connected segments, a center segment having a substantially flat upper surface 68 and two side segments each having an upper arcuate (or flat tangent) surface 70 extending downwardly from the ends of the center section, the three segments being preferably approximately equal in angular size or length. It should be noted that the upper surface 29 of each section 22b is an arc which is substantially parallel to, but has a shorter radius of curvature than the arcs forming surfaces 70 of each flight 22d. It will be seen also that because of the curvature or slope of surfaces 70 of flights 22d of each module of FIG. 9, the chordal effect on articles carried on the surface of the belt will be reduced.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In a module for constructing a conveyor belt to be driven around a circular arc segment for use in conjunction with a conveyor comb having a plurality of spaced-apart parallel teeth, which module includes first and second like pluralities of link ends of substantially identical width, each being formed to circumscribe a pivotal hole through said width, said holes of said first plurality being arranged coaxially, said holes of said second plurality being arranged coaxially, the axes of respective holes of both pluralities of link ends being substantially parallel; and a plurality of spaced apart elongated members each integrally formed with and joining a pair of corresponding link ends of said first and second pluralities, said members being joined by at least one cross member also formed integrally therewith; said link ends being dimensioned and spaced apart by a distance slightly greater than said width;

the improvement wherein said plurality of elongated members comprises first and second groups, said elongated members of said first group having upper surfaces disposed at a first like height not below the upper surface of said cross member said members of said second group having upper surfaces disposed at a second like height above the height of said upper surfaces of the elongated members of said first group;

said first and second groups being arranged to form a multiplicity of channels adapted to receive said teeth.

2. A module as defined in claim 1 wherein said upper surfaces of each elongated member of said first group is curved in an arcuate segment.

3. A module as defined in claim 1 wherein the elongated members of said first and second groups are arranged alternately.

4. A module as defined in claim 1 wherein said first and second groups have substantially like numbers of elongated members.

5. A module as defined in claim 1 wherein at least the portions of said upper surfaces of said elongated members of said second group adjacent said link ends are curved through a first arcuate segment having a first radius of curvature substantially not less than the sum of the radius of said circular arc segment and the height of said link ends.

6. A module as defined in claim 5 wherein said upper surface of said first group is curved in a second arcuate segment having a second radius of curvature substantially less than said first radius of curvature.

7. A module as defined in claim 5 wherein an intermediate portion of the upper surface of each member of said second group is substantially flat.

8. A module as defined in claim 7 wherein said intermediate portion is approximately one-third of the length of said module between the extremities of link ends connected by said member of said second group.

9. A linked belt adapted to move through a circular arc for use in conjunction with a conveyor comb having a plurality of spaced-apart parallel teeth, said belt comprising a plurality of like modules, each of said modules including first and second like pluralities of link ends of substantially identical width, each such end being formed to circumscribe a pivotal hole through said width, said holes of said first plurality being arranged coaxially, said holes of said second plurality being arranged coaxially, the axes of respective holes of both pluralities of link ends being substantially parallel;

a plurality of spaced apart elongated members each integrally formed with and joining a pair of corresponding link ends of said first and second pluralities, said members being joined by at least one cross member also formed integrally therewith;

said link ends being dimensioned and spaced apart by a distance slightly greater than said width;

said link ends of each said modules being releasably engaged between and substantially in contact with link ends of an adjacent module except for individual link ends disposed at the extreme sides of said belt;

means for pivotally connecting said modules at engaged link ends, said plurality of elongated members comprising first and second groups, the elongated members of said first group having upper surfaces disposed at a first like height not below the upper surface of said cross member, and said elongated members of said second group having upper surfaces disposed at a second like height above said first height, said elongated members being arranged so as to form a multiplicity of channels lying beneath the uppermost surface of said belt, said channels being adapted to receive said teeth.

10. A belt as defined in claim 9 wherein link ends joined by said elongated members of said first group are all of substantially equal height and the upper surface of each elongated member of said first group is curved through an arc segment having a radius of curvature approximately the sum of said height of said link ends and the radius of said circular arc.

11. A belt as defined in claim 10 wherein the upper surface of each elongated member of said second group is substantially flat.

12. A belt as defined in claim 9 wherein the intermediate portion of the upper surface of each member of said second group is substantially flat.

13. A belt as defined in claim 9 wherein said intermediate portion is approximately one-third of the length of said module between the extremities of link ends connected by said member of said second group.

14. In a conveyor system including a flat comb having a plurality of spaced-apart parallel teeth extending therefrom, a conveyor belt formed of a plurality of modules each including first and second pluralities of link ends of like width and an intermediate section integrally formed with and joining said first and second pluralities of link ends, and pivot pins joining said modules together at said link ends, and means for moving said belt through a circular arc adjacent said comb; the improvement wherein said intermediate section includes a plurality of members comprising first and second groups, said members being joined by at least one cross-rib with said members of said first group having upper surfaces disposed at a like height above the upper surface of said cross rib and below the upper surfaces of the members of said second group;

said upper surfaces of said members of said first group being curved through a first arcuate segment having a first radius of curvature substantially not less than the sum of the radius of said circular arc and the height of link ends joined by said members of said first group;

said teeth being disposed above said members of said first groups in adjacent modules and between said members of said second group of said adjacent modules so that the upper surfaces of said second group in said adjacent modules and of said teeth all lie in substantially a common plane.

15. A conveyor system as defined in claim 14 wherein at least a portion of each of said members of said second upper surface of said second group is curved in a second arcuate segment having a second radius of curvature substantially greater than said first radius of curvature.

16. A conveyor system as defined in claim 15 wherein the members of said second group are of substantially identical height and said second radius of curvature is approximately the sum of said height and said first radius of curvature.

17. A conveyor system as defined in claim 15 wherein another portion of the upper surface of each member of said second group is substantially flat.

18. A conveyor system as defined in claim 17 wherein said another portion is approximately one-third of the length of said module between the extremities of link ends connected by said member of said second group.

19. A conveyor system as defined in claim 14 including means for resiliently biasing said comb for pivotal motion so that the bottom surfaces of said teeth engage the upper surfaces of said first group.

20. A conveyor system as defined in claim 14 wherein said comb is fixedly mounted with respect to a path defined by said circular arc, and the bottom surfaces of said teeth are shaped to lie at a distance with respect to the center of curvature of said circular arc not less than said first radius of curvature.

21. A linked belt adapted to move through a circular arc for use in conjunction with a conveyor comb having a plurality of spaced-apart parallel teeth, said belt comprising:

a plurality of like modules, each of said modules including a first and second like pluralities of link ends of substantially identical width, each such end being formed to circumscribe a pivotal hole through said width;

means for joining said pluralities to one another so that the axes of said holes of said first plurality are arranged coaxially, the axes of said holes of said second plurality are arranged coaxially and the axes of respective holes of both pluralities of link ends are substantially parallel, a plurality of spaced apart elongated upstanding vanes mounted on said modules so as to extend in a substantially parallel direction to one another in a direction transversely to the axes of said holes of said both pluralities and protrude substantially perpendicularly from said module;

said link ends being dimensioned and spaced apart by a distance slightly greater than said width;

said link ends of each of said modules being releasably engaged between the link ends of an adjacent module except for individual link ends disposed at the extreme sides of said belt;

means for pivotally connecting said modules at engaged link ends;

said elongated vanes of each of said modules being arranged in staggered relation with respect to the vanes of adjacent modules, said vanes of each module being spaced from one another sufficiently to form a multiplicity of channels lying beneath the upper most surface of said belt when staggered, said channels being adapted to receive said teeth.

22. A belt in accordance with claim 21, wherein the upper surfaces of said vanes of said modules define said uppermost surface of said belt.

23. A belt in accordance with claim 21, wherein said vanes are each integrally formed with and join a pair of corresponding link ends of said first and second pluralities.

24. A belt in accordance with claim 21, further including at least one cross member formed integrally with said vanes for joining said vanes.

* * * * *